United States Patent [19]

Sparks

[11] Patent Number: 4,585,242

[45] Date of Patent: Apr. 29, 1986

[54] FORCED AIR RAIN DIVERTER

[76] Inventor: Dilmus L. Sparks, 5148 London Rd., Montgomery, Ala. 36109

[21] Appl. No.: 607,734

[22] Filed: May 7, 1984

[51] Int. Cl.⁴ .................................................. B62B 9/16
[52] U.S. Cl. ........................... 280/153 R; 280/154.5 R; 296/15
[58] Field of Search ................... 280/154.5 R, 153 R; 296/15, 91; 180/84; 98/212, 213

[56] References Cited

U.S. PATENT DOCUMENTS

| | | | |
|---|---|---|---|
| 2,223,378 | 12/1940 | Martin | 296/91 |
| 3,743,343 | 7/1973 | Grote | 296/1.5 |
| 3,834,732 | 9/1974 | Schons | 280/154.5 R |
| 4,486,046 | 12/1984 | Whitney | 280/154.5 R |

*Primary Examiner*—John J. Love
*Assistant Examiner*—Joseph G. McCarthy

[57] ABSTRACT

This forced air rain deflector is attached to the sides of a vehicle body, one on each side, and they create a curtain of air to push downward rain, mist, and water which is brought up by the wheel motion of the vehicle. Primarily, each unit is a channel with air scoops on its sides for receiving air, which is deflected downward and out of the channel by vanes secured within the unit.

1 Claim, 7 Drawing Figures

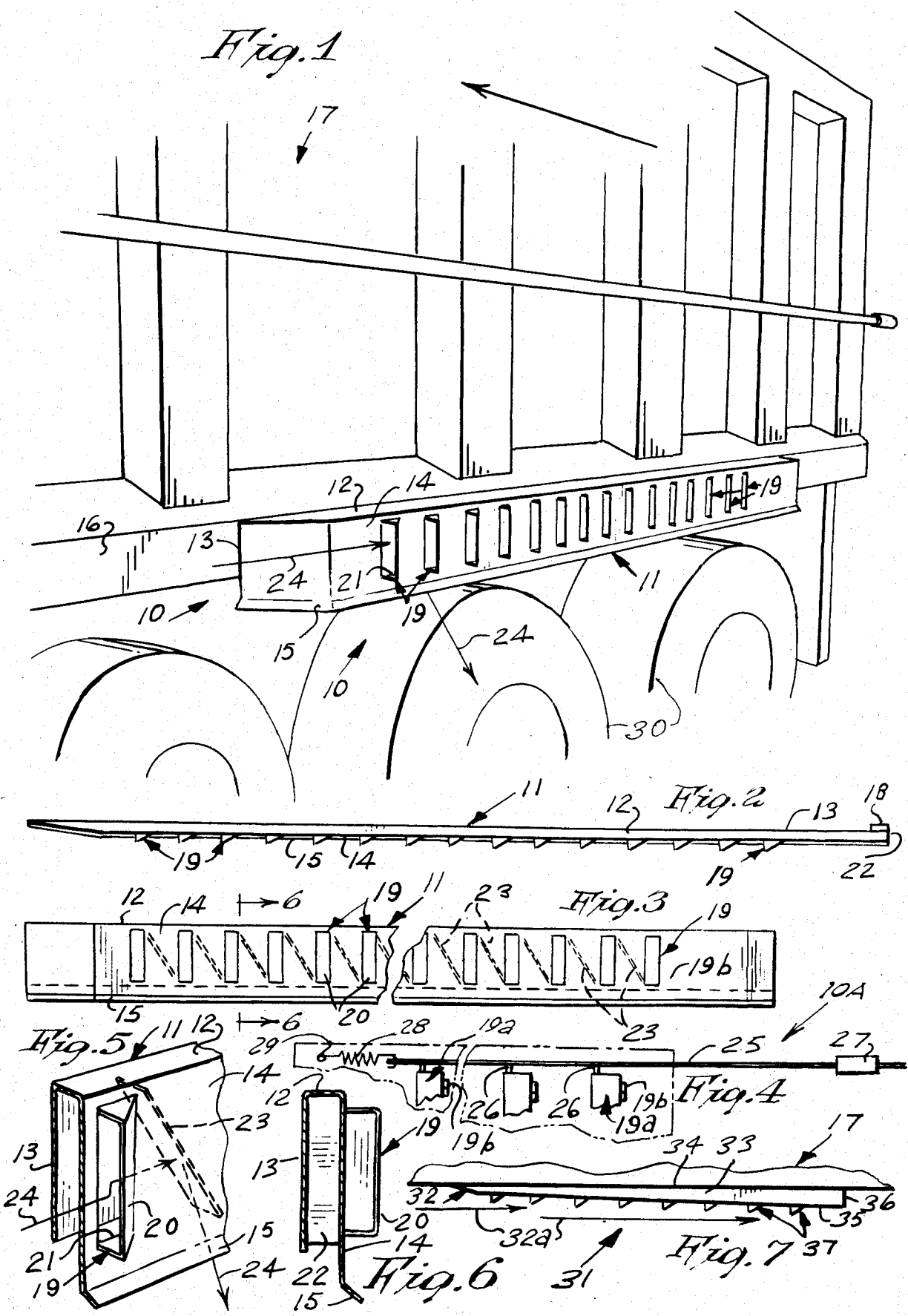

FORCED AIR RAIN DIVERTER

This invention relates to deflector devices, and more particularly, to a forced air rain diverter.

The principal object of this invention is to provide a forced air rain diverter, which will be employed on automotive vehicles, to deflect a strong curtain of air downward along the sides of the tires and wheels, thus forcing rain, mist, and water generated by the moving tires on a wet pavement, to a low level, giving the passing or oncoming motorist an unobstructed view of the roadway.

Another object of this invention is to provide a forced air rain diverter, which will be adapted to, but not limited to, installation on the lower rail of vans, trailers or dump bodies, and the length of the structure will be determined by the tire size and length of the vehicle body.

Another object of this invention is to provide a forced air rain diverter, which will be designed to be installed on the left and right sides of the vehicle body, over the wheel areas, or they may be adapted to extend the full length of the vehicle body, for maximum effectiveness.

A further object of this invention is to provide a forced air rain diverter, which will be adaptable to all vehicles that roll on rubber tires.

Other objects are to provide a forced air rain diverter, which is simple in design, inexpensive to manufacture, rugged in construction, easy to use, and efficient in operation.

These, and other objects, will be readily evident, upon a study of the following specification, and the accompanying drawing, wherein:

FIG. 1 is a fragmentary perspective view of a vehicle, showing the present invention installed thereon;

FIG. 2 is a top plan view of FIG. 3;

FIG. 3 is a front elevational view of FIG. 2;

FIG. 4 is an enlarged fragmentary side elevational view of a modified design of the invention;

FIG. 5 is an enlarged fragmentary perspective view of FIG. 1, which is shown in vertical cross-section;

FIG. 6 is an end elevational view of FIG. 5, and

FIG. 7 is a top plan view of a modified form of the invention, shown installed to a vehicle body, which is shown fragmentary.

Accordingly, a device 10, which is one of a pair, is shown to include a main body 11, fabricated of a suitable metal. In cross-section, main body 11 is of an inverted "U"-shape, having a top wall 12, a mounting side leg 13, and a longer opposite leg 14, which includes an angularly and outwardly disposed lip 15, extending its entire longitudinal length. The forward end of the main body 11 is tapered to a chisel-shape, by means of a front end portion of the leg 14 being angularly inclined toward a forward end edge of the side leg 13; the vertical front edges of both legs being fixedly secured together. The outside surface of leg 13 is attached to the outside face of rail 16 of vehicle body 17, in a suitable manner (not shown). A heel block 18, which is optional, may be suitably secured to the rear outside surface of mounting leg 13, so as to hold the rear of device 10 angularly outward, for maximum effectiveness in operation, by enabling more air to enter the rearmost louvers 19, which consist of vertically spaced scoops 20, fixedly secured, in a suitable manner, over similarly-spaced vertical cut-out openings 21 through leg 14.

The main body 11 also includes a rear end wall 22, which is fixedly secured, in a suitable manner, to its rear end, which closes off main body 11 at its rear, as does the angularly formed portion of leg 14 in the front. Behind each louver 19, on the interior of main body 11, an angularly disposed vane or baffle 23 is fixedly secured, at its longitudinal side edges, to the inside surfaces of legs 13 and 14, and serves to divert the air downward and out of the bottom of the main body, as indicated by the arrows 24 in FIGS. 1 and 5 of the drawing. The abovementioned diverting of air serves to direct rain, mist, and water forcefully to a very low level, when caused by the vehicle's tires when the vehicle is in forward motion, thus providing the passing or oncoming motorist with a less obstructed view of the roadway, for increased safety.

In use, one device 10 is secured to rail 16 or other suitable mounting location on each side of vehicle body 17, with the tapered forward ends of their main bodies 11 towards the front, the devices 10 being secured over the wheel 30 areas. When the vehicle body is in forward motion, air enters the louvers 19 and 19a, where it strikes the vanes or baffles 23, and is directed downward towards the rear, which forcefully pushes the rain and water, brought up by wheel motion, downwards and rearwards of body 17.

Referring now to FIG. 4 of the drawing, a modified form 10A of the invention is shown which is the same as device 10, except instead of the louvers being fixedly stationary (as shown in all the other drawing figures, and as described hereabove), this form of the invention is made with operably pivotable louvers 19a, each of which is attached to a pair of hinges 19b mounted on an outside of leg 14. All the louvers are made to pivot simultaneously together in a same direction and a same amount by means of a common control rod 25 pushing or pulling an upward pin 26 along an upper edge of each of the louvers.

An air operable control valve 27 is suitably secured to rod 25 at one end, for pivoting louvers 19a open and closed, for receiving more or less air, and a return spring 28 is hooked in the forward end of rod 25 at one end, and is suitably hooked onto a pin 29, which is fixedly secured to the bottom surface of top wall 12 of main body 11. The pivotal louvers 19a are adjusted as to angular position, for receiving more or less air, by the operator manually operating the control valve 27 from the cab of his vehicle.

It shall be noted, that the valve 27 is preferably of the electro-magnetic type, which connects with, and is operated by, a windshield wiper switch, or by a separate switch. However, control of louvers 19a is not limited to the abovementioned switch type.

Referring now to FIG. 7 of the drawing, a modified form of device 31 is shown to include a main body 32, which is similar in construction to device 10, with the exception, that it tapers outward at its rear end, for maximum reception of air along its entire length, as indicated by means of the arrows 32a. Main body 32 includes a top wall 33, a leg 34, a leg 35, a rear wall 36, a plurality of spaced louvers 37, and internal vanes (not shown), as was heretofore described of device 10.

In use, device 31 is also attached to the vehicle body 17 in pairs, and its function is similar to that described of device 10, with the exception, that 31 does not include pivotally controlled portions.

While various changes may be made in the detail constuction, it is understood that such changes will be within the spirit and scope of the present invention, as is defined by the appended claims.

What I now claim, is:

1. A forced air rain diverter device for automotive vehicles, comprising, in combination, a main body and a plurality of vanes secured in said main body; said main body being of inverted, "U"-shaped configuration, and its front end and rear end being closed; said main body having a longitudinally extending opening at its lower end extending from the front end to the rear end; a plurality of spaced scoops along one of the legs of the main body; and said vanes are fixedly secured angularly to the inside surfaces of the legs of said main body at their longitudinal side edges, and said vanes deflect impact air downward, when the vehicle to which it is attached is in forward motion, causing rain, mist and water, in the wheel area of said vehicle, to be urged downward forcefully.

* * * * *